(12) United States Patent
Safont et al.

(10) Patent No.: US 6,641,298 B2
(45) Date of Patent: Nov. 4, 2003

(54) PROCESSING CONTAINER FOR FOODSTUFFS

(75) Inventors: Vicenc Safont, Montgat (ES); José Luis Roman, Sant Just Desvern (ES)

(73) Assignee: Braun GmbH (DE)

( * ) Notice: Subject to any disclaimer, the term of this patent is extended or adjusted under 35 U.S.C. 154(b) by 0 days.

(21) Appl. No.: 10/228,504

(22) Filed: Aug. 27, 2002

(65) Prior Publication Data

US 2003/0007418 A1 Jan. 9, 2003

Related U.S. Application Data

(63) Continuation of application No. PCT/EP01/02305, filed on Mar. 1, 2001.

(30) Foreign Application Priority Data

Mar. 17, 2000 (DE) .......................................... 100 13 250

(51) Int. Cl.[7] .................................................. B01F 7/16
(52) U.S. Cl. ...................................... 366/247; 366/331
(58) Field of Search ................................ 366/247, 244, 366/331; 49/348

(56) References Cited

U.S. PATENT DOCUMENTS 224,848 A * 2/1880 Scudder ...................... 366/247
6,000,650 A 12/1999 Penaranda et al.
6,089,746 A * 7/2000 Martin ........................ 366/331

FOREIGN PATENT DOCUMENTS

| DE | 2 250 177 | 1/1974 |
| DE | 3117773 A1 | 12/1982 |
| DE | 69502291 T2 | 9/1998 |
| EP | 0 221 392 B1 | 5/1990 |
| EP | 0 529 287 B1 | 9/1995 |
| FR | 2 725 384 | 4/1996 |

* cited by examiner

*Primary Examiner*—Tony G. Soohoo
(74) *Attorney, Agent, or Firm*—Fish & Richardson PC

(57) ABSTRACT

A processing container for foodstuffs, with a removable container lid and a tool shaft arranged in the container interior and having processing tools fitted thereto, with the tool shaft being mounted for rotation about its center axis in a vertical position by means of an upper bearing arrangement in the container lid and a lower bearing arrangement in the container bottom. The lower bearing arrangement is configured such that the tool shaft is rotatably and tiltably mounted thereon, thereby enabling the tool shaft to be locked in a tilted position when the container lid is removed.

23 Claims, 5 Drawing Sheets

PROCESSING CONTAINER FOR FOODSTUFFS

CROSS REFERENCE TO RELATED APPLICATIONS

This is a continuation of PCT application serial no. PCT/EP01/02305, filed Mar. 1, 2001, which claims priority from German application serial number 10013250.2, filed Mar. 17, 2000. The entire contents of the above-mentioned PCT application are hereby incorporated by reference.

TECHNICAL FIELD

This invention relates to a processing container for foodstuffs.

BACKGROUND

From DE-3117773 A1 there is already known an electrical household appliance with a cup-type attachment in which a cutting mechanism adapted to be driven by a drive motor is arranged. The cutting mechanism is equipped with a slow-down brake for bringing the drive motor to a quick standstill. In this arrangement the brake is positioned between a mountable lid and a motor base. When the lid is interlocked with the motor base, an associated latching device is moved downward and the friction lining provided between the lid and the base is removed from a driving disk so that the brake is no longer able to act between the processing tool and the appliance. Such a brake can only be used, however, on a household appliance with a suitable constructional design.

EP-0221392 B1 discloses a cornminuting appliance for comminuting, for example, parsley, onions etc., which includes a lid and a container closable by the lid. The lid has a first and a second coupling member as a coupling device, which are interconnected by a gear arrangement. The second coupling member situated in the container is rotatably connectable to a blade rotatable in the container. To drive the blade the first coupling member is made to engage with the processing tool of a kitchen machine, for example with the blade of an immersion blender, so that after the immersion blender is switched on the rotating processing tool sets the first coupling member in rotation, and the blade in the container is likewise caused to rotate via the gearing and the second coupling member. When the immersion blender is removed from the first coupling member, thus interrupting the drive train to the blade provided in the container of the comminuting appliance, said blade will continue to run on for some time on account of its inertia, particularly when there is no food in the container. This may result in injuries to an operator's hand if he or she raises the lid from the container and reaches inside the container to remove the blade from the container when the blade is still rotating.

DE-A-2250177 discloses a kitchen appliance in which a brake acting on the processing tool is provided in the transmission path from the drive motor to the processing tool. In this arrangement the brake is controlled by a pressure rod which passes through the center of the drive mechanism and the blade and is itself controlled by the lid of the appliance. The processing tool itself is rotatably or immovably mounted in the bottom of the kitchen appliance.

Finally, EP 0 529 287 B1 discloses a comminuting device for an electrical kitchen appliance. In the device a tool shaft is connectable to a drive shaft via a coupling arrangement. In this state of the art a brake controllable by a spring is provided in the tool shaft between the coupling arrangement and the processing tool. The spring displaces the tool shaft upon disengagement in axial direction until brake elements fitted to the inner circumference of the hollow tool shaft cooperate with corresponding brake elements at the lower shaft bearing, causing the tool shaft to be braked.

SUMMARY

It is an object of the present invention to provide an improved processing container for foodstuffs in which the risk of injury to users from rotating tools is considerably reduced. At the same time the processing container should afford simplicity and economy of manufacture.

In some embodiments, the invention considerably reduces the risk of injury for users from rotating tools because the tool shaft is automatically braked upon removal of the container lid. At the same time the processing container affords simplicity and economy of manufacture using, for example, a plastics material. The rotating tool shaft is simply braked in that, after the container lid is raised, said shaft tilts about the lower bearing, its lower end running against the lower bearing. Through the tilting movement the center axis of the tool shaft intersects the perpendicular at an acute angle. This creates in astonishingly simple manner a brake mechanism whose effectiveness is based solely on the fact that the center of gravity of the tool shaft lies above the ball head of the bearing journal and an unstable state of equilibrium develops when the upper bearing is removed. After the tool shaft tilts it rests on the ball head on the one hand and on a point of contact between the tool shaft and the bearing bushing on the other hand. At this point of contact the residual rotation of the tool shaft attributable to inertia is braked by mechanical friction.

Unlike some embodiments of the art, no elaborate braking mechanism with moveable parts is formed within the tool shaft. Dirt accumulation in hard-to-reach recesses and accordingly unhygienic conditions of the processing container are thus avoided. The tool shaft is completely enclosed and water-tight.

Such a processing container can be used, for example, on generally known kitchen appliances. However, it can also be used, accordingly modified in construction, on stand blenders and cornminuting appliances.

A particularly advantageous embodiment provides for bearing the lower end of the tool shaft rotatably and tiltably in a simple manner. The bearing journal and the ball head are made of a suitable solid material such as brass or steel. The ball socket is made of a plastics material suitable for plain bearings.

The bearing journal bushing may be joined by adhesive bonding to the container bottom, for example, provided a suitable material is selected. Projections of the bearing journal bushing may be provided to enhance the braking effect.

In some cases the shaft upper bearing arrangement performs a multiple function, namely a transmission function for the drive torque on the one hand and a bearing function on the other hand. The coupling can be accomplished by a simple positive coupling, such as with spur gearing. The bearing arrangement of the coupling mount can be constructed as a plain bearing or a rolling bearing.

The coupling mount may be constructed, for example, in the form of a plastic injection molded part coupled to the drive shaft.

By constructing the tool shaft as a hollow shaft made of a plastics material, the braking operation may be additionally accelerated because the moment of inertia of such a shaft is very small and therefore only a low residual torque exists after decoupling.

Some embodiments play a particularly important role because of the particularly high risk of injury existing with the extremely sharp blades customary in household machines.

Further embodiments and advantages of the present invention will be described in the following with reference to the accompanying drawings.

DETAILED DESCRIPTION

Figure 1:
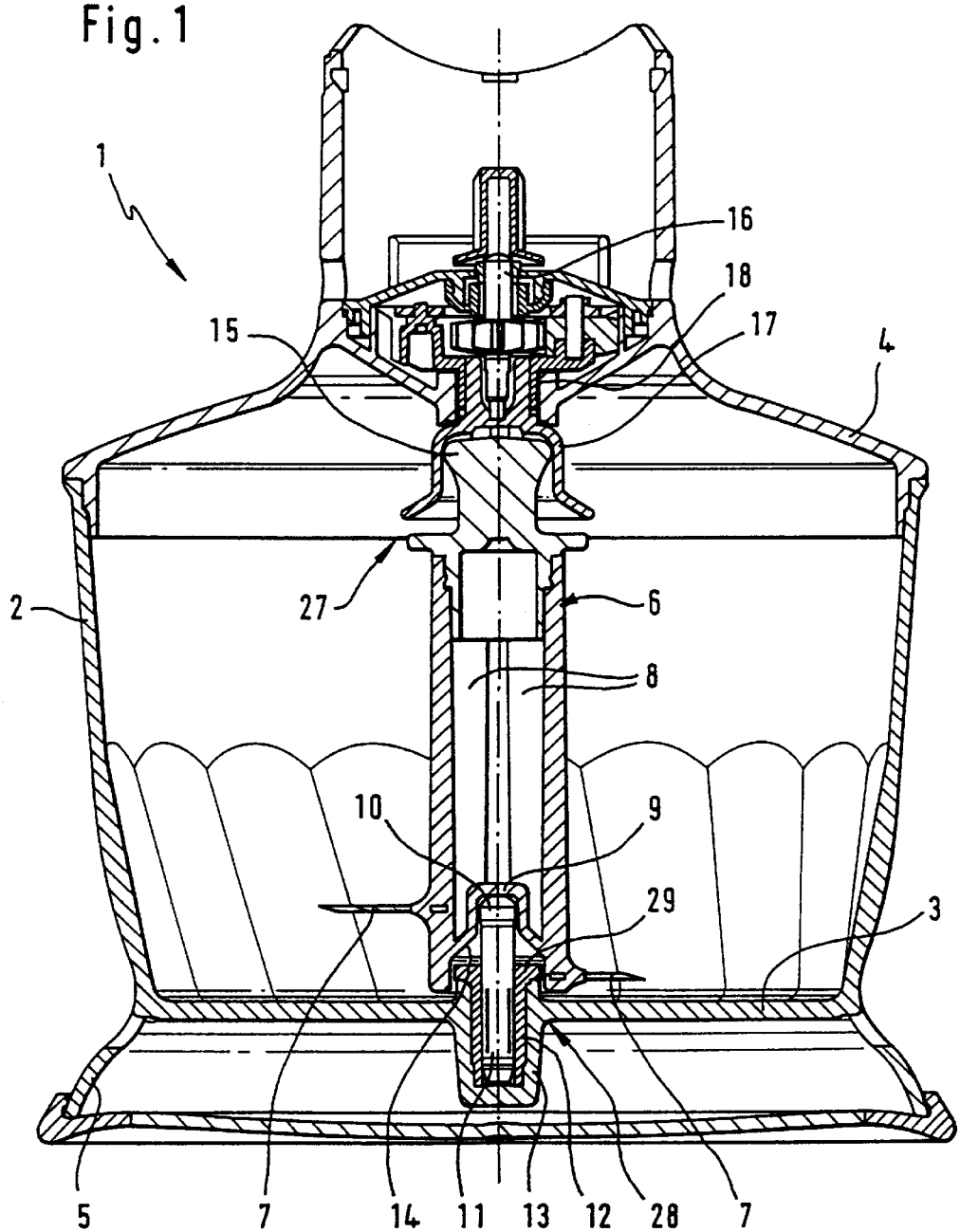
FIG. 1 is a sectional view of an advantageous embodiment of the invention.

FIGS. 1 to 9 are representations of a preferred embodiment of the present invention. FIG. 1 shows an essentially cylindrical processing container 1 having a container wall 2 and a container bottom 3. The processing container 1 sits on a container base 5.

In the ready-to-use state the processing container 1 has its upper open end closed by a container lid 4. The container lid 4 is of a slightly conical configuration and has at its center a cylindrical extension. A drive shaft 16 with gearing unit is accommodated in said extension. The drive shaft 16 is rotatably mounted in a bearing arrangement 18 and extends further into the interior of the processing container 1 as a coupling mount 17.

A bearing journal 11 with a ball head 10 is provided in the container bottom 3 concentrically with the drive shaft 16. In this arrangement the bearing journal 11 is received by a bearing journal bushing 12, which is held in turn in a bushing mount 13 formed in the container bottom 3.

Figure 6:
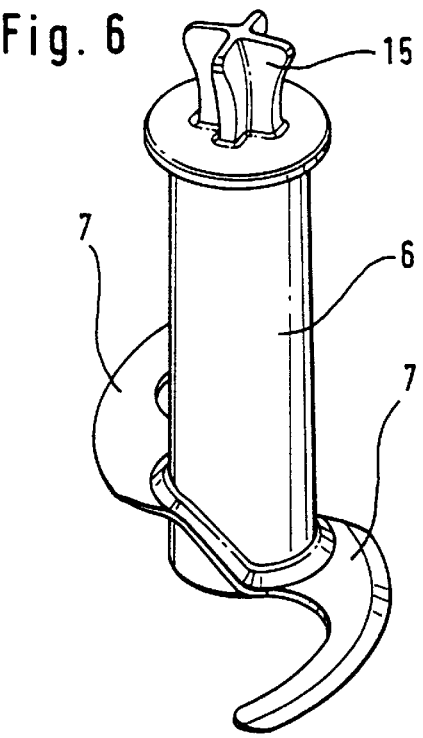
FIG. 6 is a perspective view from above the tool shaft component of FIG. 1.
Figure 8:
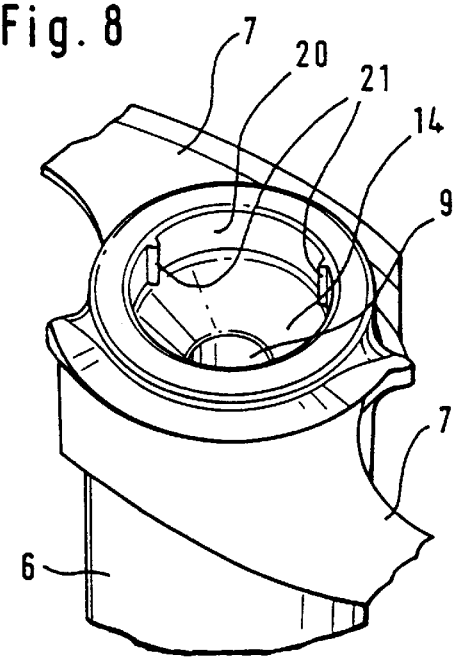
FIG. 8 is a view of a detail VIII of FIG. 7.
Figure 7:
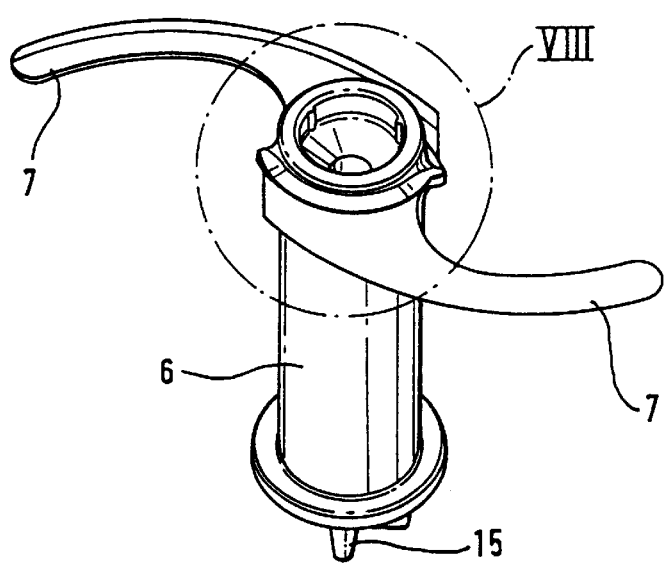
FIG. 7 is a perspective view from below the tool shaft component of FIG. 1.

Accommodated between the coupling mount 17 and the bearing journal 11 is a tool shaft 6 which is shown as a single part in a perspective view in FIGS. 6 to 8. The tool shaft 6 has at its upper end a coupling member 15 having crosswise arranged bars for engagement with mating recesses of the coupling mount 17. The rounded outer edges of the crosswise engaging bars thus form, together with corresponding walls of the coupling mount 17, points of contact that act as the upper bearing arrangement 27. In addition, at the bottom end of the tool shaft 6 there is arranged a processing tool 7 which in the present embodiment is constructed as a crescent-shaped blade. The tool shaft 6 is constructed as a hollow shaft having reinforcement ribs 8 arranged inside along the longitudinal axis. In the present embodiment the shaft is made of a suitable thermoplastic material. At its lower end the tool shaft 6 terminates in a ball socket 9 shown in FIGS. 1, 8 and 9, by way of which it is rotatably and tiltably mounted on the ball head 10 of the bearing journal 11. Furthermore, the tool shaft 6 has an annular opening at its lower end, which is constructed as a thrust face 20. The annular thrust face 20 has bars 21 distributed uniformly around the circumference. Furthermore, the thrust face 20 continues upwardly in a cone 14 which in turn forms a ball socket 9 at its upper end. FIGS. 6 and 7 also show the processing tool 7 constructed as crescent-shaped blades.

Figure 2:
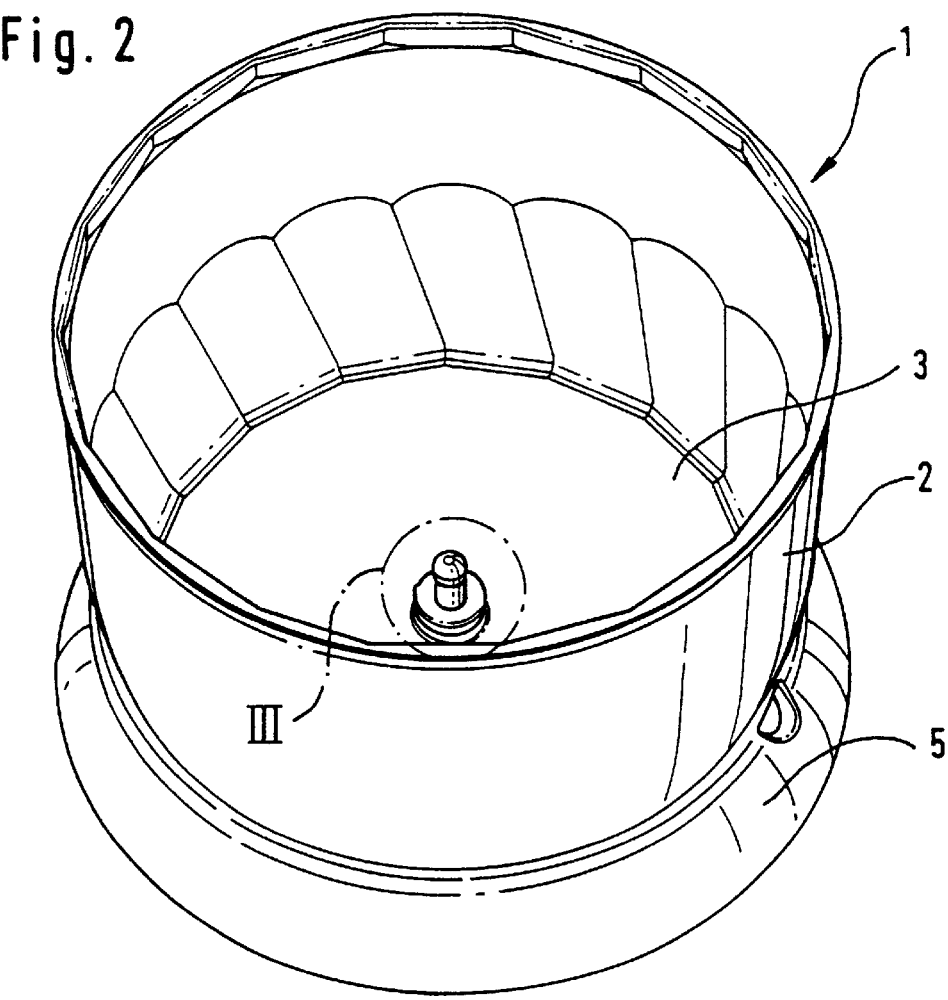
FIG. 2 is a perspective view of the container body of FIG. 1.
Figure 3:
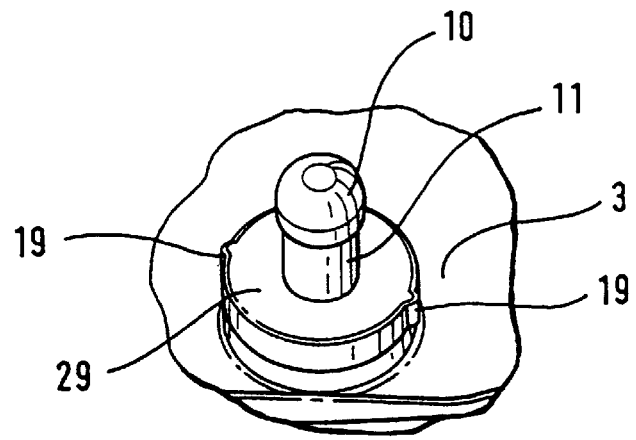
FIG. 3 is a view of a detail III of FIG. 2.
Figure 4:
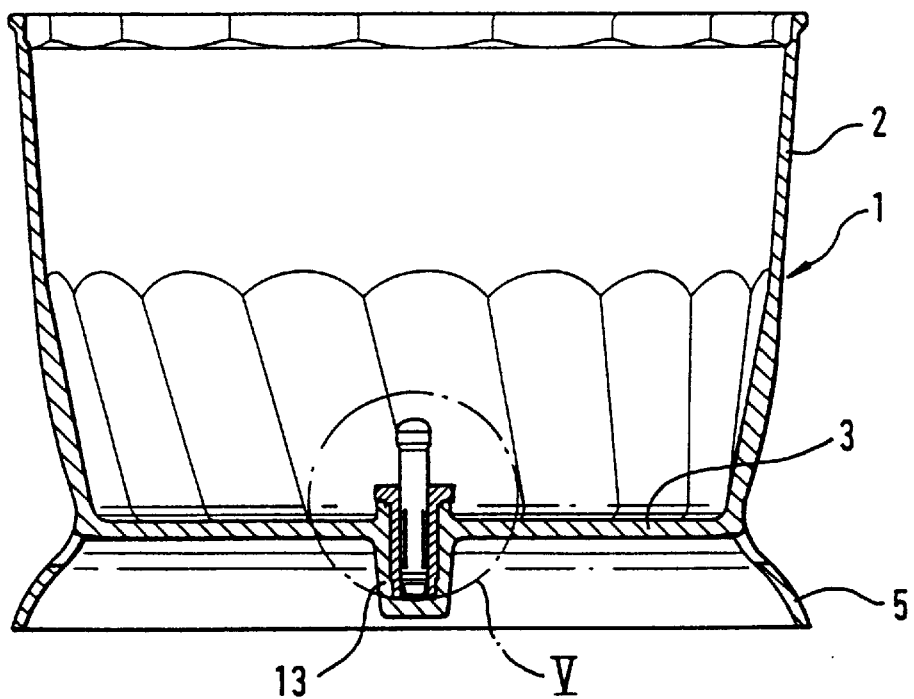
FIG. 4 is a sectional view of the container body of FIG. 1.
Figure 5:
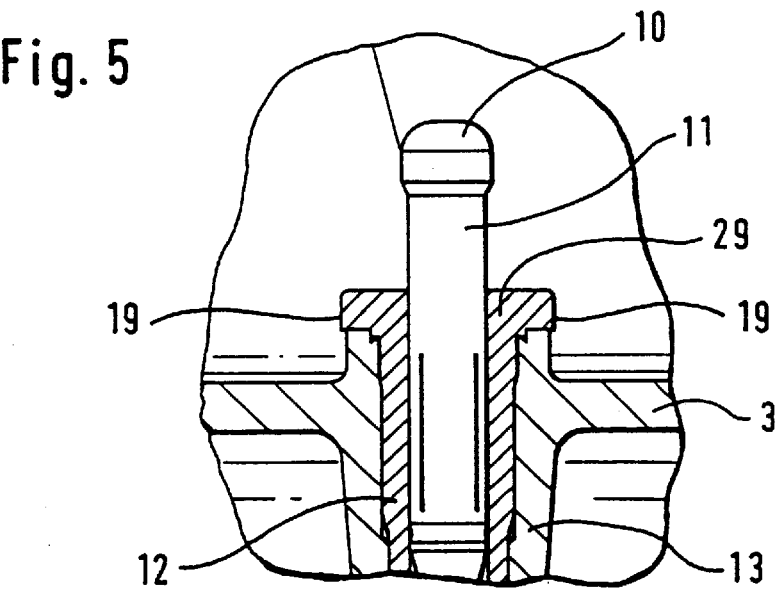
FIG. 5 is a view of a detail V of FIG. 4.

FIGS. 2 and 4 show the container body 1 without the container lid 4 in a perspective and sectional view, respectively. The mounting of the bearing journal 11 in the container bottom 3 is represented in detail in FIGS. 3 and 5. The bearing journal 11 made of steel has at its upper end a semi-spherical ball head 10 of a diameter greater than the diameter of the bearing journal 11. The bearing journal 11 is received in a bearing journal bushing 12 made of plastic, which in turn is inserted in a bushing mount 13 formed in the container bottom 3 of the processing container 1 and adhesive-bonded therein. The bearing journal bushing 12 has at its upper end a circumferential collar 29 provided with projections 19 on its outer circumference.

Figure 9:
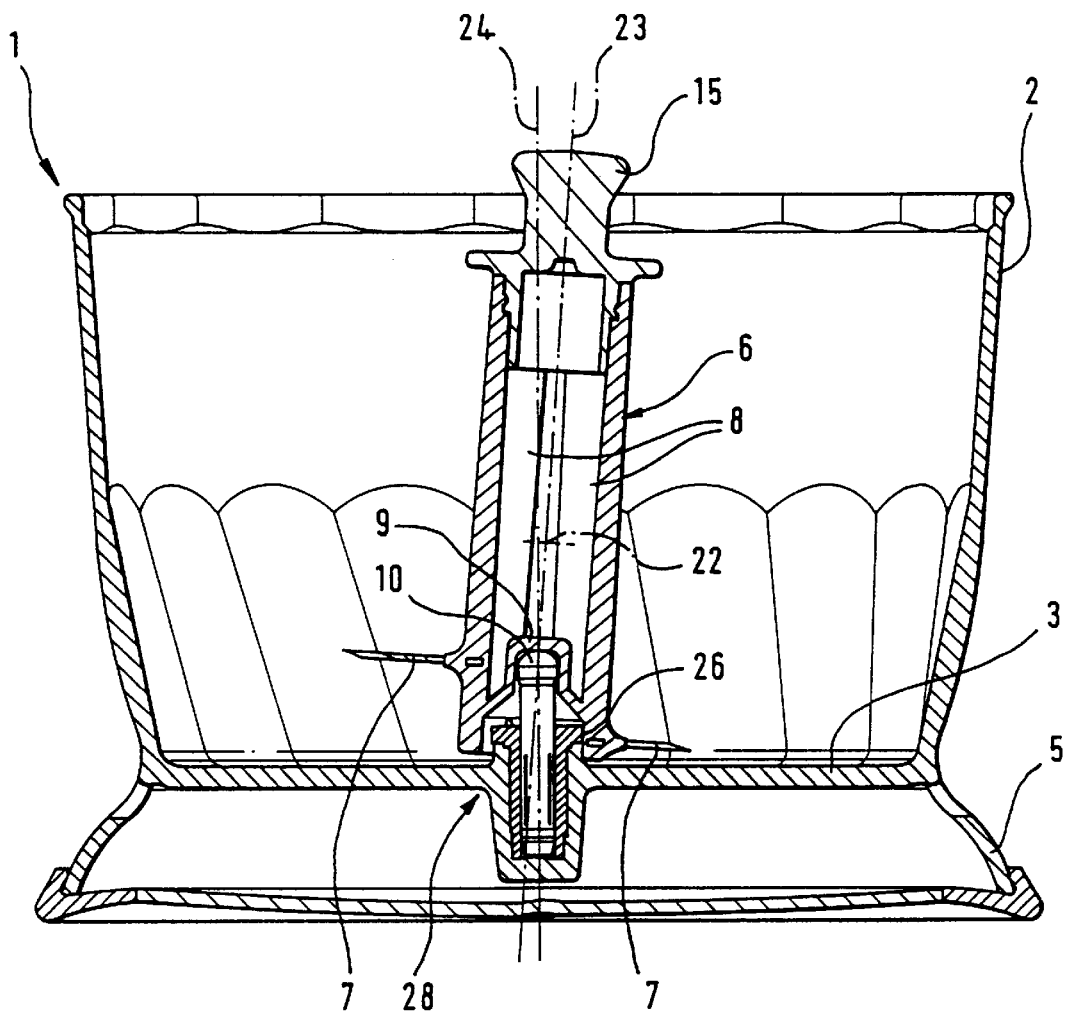
FIG. 9 is a sectional view of the container body of FIG. 1 showing the tool shaft installed.

FIG. 9 shows the processing container 1 with the container lid 4 removed, whereby the upper bearing arrangement of the tool shaft 6 is absent. Since the lower bearing arrangement of the tool shaft 6 is formed by the ball head 10 and the ball socket 9, the tool shaft 6 tilts until the thrust face 20 and in particular the bars 21 come into contact with the upper collar 29 of the bearing journal bushing 12 and in particular with the projections 19. At the point of contact 26 thus formed, the tool shaft 6 is braked. The center of gravity 22 of the tool shaft 6 then lies above the ball head 10. As a result of the tool shaft 6 tilting, the center axis 23 of the tool shaft 6 is at an acute angle to the perpendicular 24.

During operation, the drive shaft 16 drives the tool shaft 6 having its lower end rotatably mounted on the bearing journal 11 via the coupling mount 17 and the coupling member 15. In the process, the processing tool 7 constructed as crescent-shaped blades rotates at high speed, enabling also fine foodstuffs such as chives to be comminuted with a clean cut. The container lid 4 is closed throughout the entire operation. As soon as the container lid 4 is raised, the coupling mount 17 decouples from the coupling member 15, resulting in no more drive power being transmitted to the tool shaft 6. On account of its inertia the tool shaft 6 still tends to continue to rotate at considerable speed. To stop this tendency and hence avoid the risk of injury, for example due to prematurely reaching into the processing container, the tool shaft 6 is immediately braked by tilting after the container lid 4 is raised.

What is claimed is:

1. A processing container for foodstuffs, comprising
   a container defining an interior and having a removable container lid; and
   a tool shaft arranged in the container interior and having a processing tool fitted thereto, with the tool shaft being mounted for rotation about its center axis in a vertical position by means of an upper bearing arrangement in the container lid and a lower bearing arrangement in a bottom of the container;
   wherein the lower bearing arrangement is configured such that the tool shaft is rotatably and tiltably mounted thereon, thereby enabling the tool shaft to move to a tilted position when the container lid is removed;
   wherein tilting of the tool shaft upon removal of the container lid automatically brakes the tool shaft.

2. The processing container of claim 1, wherein the lower bearing arrangement includes a stationary bearing journal having a ball head formed thereon which is received in a ball socket formed at the shaft lower end.

3. The processing container of claim 2, wherein the tool shaft has a center of gravity disposed above the ball head of the stationary bearing journal of the lower bearing arrangement.

4. The processing container of claim 2, wherein the bearing journal is received in a cylindrical bearing journal bushing fixed in the container bottom and having a protruding upper collar, with outwardly protruding projections being provided at an outer periphery of the collar.

5. The processing container of claim 1, wherein the shaft lower end has on its inner circumference an annular thrust face.

6. The processing container of claim 5, wherein the thrust face has bars that protrude radially inwardly.

7. The processing container of claim 1, wherein the upper bearing arrangement includes a coupling member formed at an upper end of the shaft, and a coupling mount carried on the container lid.

8. The processing container of claim 7, wherein the coupling mount is coupled to a drive shaft.

9. The processing container of claim 1, wherein the tool shaft is fabricated as a hollow shaft made of a plastic material.

10. The processing container of claim 1, wherein the processing tool includes blades for comminuting food materials.

11. The processing container of claim 1, wherein the tool shaft is braked by mechanical friction in the lower bearing arrangement.

12. A food processing container comprising
a container defining an interior and having a removable container lid;
a tool shaft arranged in the container interior and having a processing tool fitted thereto, with the tool shaft being mounted for rotation in a vertical position;
an upper bearing mounted in the container lid and supporting an upper end of the tool shaft for rotation; and
a lower bearing secured to a bottom of the container and supporting a lower end of the tool shaft for rotation, the tool shaft tiltable upon the lower bearing from its vertical position with the container lid and upper bearing removed; and
a stationary braking surface secured to the container bottom and disposed below the lower bearing, the braking surface arranged to engage the tool shaft with the tool shaft tilted from its vertical position, to brake rotation of the tool shaft.

13. The food processing container of claim 12, wherein the stationary braking surface is a peripheral surface of a bushing extending upward from the bottom of the container and disposed within a cavity defined in the lower end of the tool shaft, the tool shaft and peripheral bushing surface defining therebetween an annular space with the tool shaft it its vertical position.

14. The food processing container of claim 13, wherein the braking surface has projections extending radially outwardly therefrom for engaging and braking rotation of the tool shaft when the tool shaft tilts from its vertical position.

15. The food processing container of claim 13, wherein the cavity defined in the lower end of the tool shaft has bars extending radially inwardly therefrom for engaging the braking surface when the tool shaft tilts from its vertical position.

16. The food processing container of claim 12, wherein the lower bearing comprises a stationary ball head received for rotation within a ball socket defined within the lower end of the tool shaft.

17. The food processing container of claim 13, wherein the braking surface has projections extending therefrom for engaging the tool shaft when the tool shaft tilts from its vertical position.

18. The food processing container of claim 12, wherein the lower end of the tool shaft has bars extending therefrom for engaging the braking surface when the tool shaft tilts from its vertical position.

19. The food processing container of claim 18, wherein the braking surface has projections extending therefrom for engaging the bars of the tool shaft when the tool shaft tilts from its vertical position.

20. The food processing container of claim 12, wherein the processing tool includes blades for comminuting food materials within the container.

21. A processing container for foodstuffs, comprising
a container defining an interior and having a removable container lid; and
a tool shaft arranged in the container interior and having a processing tool fitted thereto, with the tool shaft being mounted for rotation about its center axis in a vertical position by means of an upper bearing arrangement in the container lid and a lower bearing arrangement in a bottom of the container;
wherein the lower bearing arrangement is configured such that the tool shaft is rotatably and tiltably mounted thereon, thereby enabling the tool shaft to move to a tilted position when the container lid is removed;
wherein the lower bearing arrangement includes a stationary bearing journal having a ball head formed thereon which is received in a ball socket formed at the shaft lower end; and
wherein the bearing journal is received in a cylindrical bearing journal bushing fixed in the container bottom and having a protruding upper collar, with outwardly protruding projections being provided at an outer periphery of the collar.

22. A processing container for foodstuffs, comprising
a container defining an interior and having a removable container lid; and
a tool shaft arranged in the container interior and having a processing tool fitted thereto, with the tool shaft being mounted for rotation about its center axis in a vertical position by means of an upper bearing arrangement in the container lid and a lower bearing arrangement in a bottom of the container;
wherein the lower bearing arrangement is configured such that the tool shaft is rotatably and tiltably mounted thereon, thereby enabling the tool shaft to move to a tilted position when the container lid is removed;
wherein the shaft lower end has on its inner circumference an annular thrust face; and
wherein the thrust face has bars that protrude radially inwardly.

23. A processing container for foodstuffs, comprising
a container defining an interior and having a removable container lid; and a tool shaft arranged in the container interior and having a processing tool fitted thereto, with the tool shaft being mounted for rotation about its center axis in a vertical position by means of an upper bearing arrangement in the container lid and a lower bearing arrangement in a bottom of the container;

wherein the lower bearing arrangement is configured such that the tool shaft is rotatably and tiltably mounted thereon, thereby enabling the tool shaft to move to a tilted position when the container lid is removed;

wherein the lower bearing arrangement includes a stationary bearing journal having a ball head formed thereon which is received in a ball socket formed at the shaft lower end; and wherein the tool shaft has a center of gravity disposed above the ball head of the stationary bearing journal of the lower bearing arrangement.

* * * * *

UNITED STATES PATENT AND TRADEMARK OFFICE
CERTIFICATE OF CORRECTION

PATENT NO. : 6,641,298 B2
DATED : November 4, 2003
INVENTOR(S) : Vicenc Safont and Jose Luis Roman It is certified that error appears in the above-identified patent and that said Letters Patent is hereby corrected as shown below:

Column 6,
Line 3, delete "13" and insert -- 12 --

Signed and Sealed this

Twenty-fifth Day of May, 2004

JON W. DUDAS
*Acting Director of the United States Patent and Trademark Office*